United States Patent [19]
Takeda et al.

[11] Patent Number: 5,934,177
[45] Date of Patent: Aug. 10, 1999

[54] AUTOMATIC BREAD MAKER

[75] Inventors: Shoichi Takeda, Hanishina-gun; Fumihiko Akahane, Nagano, both of Japan

[73] Assignee: MK Seiko Co., Ltd., Nagano, Japan

[21] Appl. No.: 09/064,837

[22] Filed: Apr. 23, 1998

[30] Foreign Application Priority Data

| Apr. 24, 1997 | [JP] | Japan | ................................. 9-123461 |
| Jul. 15, 1997 | [JP] | Japan | ................................. 9-207253 |
| Sep. 2, 1997 | [JP] | Japan | ................................. 9-237169 |

[51] Int. Cl.⁶ .............................. A21B 1/00; A21D 8/00; A47J 27/00; A47J 37/01
[52] U.S. Cl. ............................ 99/327; 99/348; 99/468; 366/98; 366/146; 366/314; 366/601
[58] Field of Search ................ 99/325–328, 331–335, 99/348, 467, 468, 483, 484, 486, 352–355; 366/69, 96–98, 144–146, 149, 314, 601; 426/504, 512, 523; 364/400; 219/492, 497, 400

[56] References Cited

U.S. PATENT DOCUMENTS

| 4,538,509 | 9/1985 | Ojima et al. | ................................. 99/348 |
| 4,984,512 | 1/1991 | Takahashi et al. | ......................... 99/327 |
| 5,076,153 | 12/1991 | Takahashi et al. | ................... 366/601 X |
| 5,145,252 | 9/1992 | Oh | ............................................... 366/98 |
| 5,146,840 | 9/1992 | Hedenberg | ................................. 99/328 |
| 5,363,746 | 11/1994 | Gordon | ................................... 99/455 X |
| 5,415,081 | 5/1995 | Yoshida et al. | ............................. 99/326 |
| 5,584,230 | 12/1996 | Yoshida et al. | ....................... 366/314 X |
| 5,628,240 | 5/1997 | Yoshida et al. | ......................... 99/468 X |
| 5,694,832 | 12/1997 | Kakimoto et al. | .......................... 99/348 |
| 5,704,277 | 1/1998 | Yung | ......................................... 99/327 |
| 5,794,521 | 8/1998 | Yung | ................................... 366/146 X |
| 5,839,356 | 11/1998 | Dornbush et al. | ......................... 99/331 |

*Primary Examiner*—Timothy F. Simone
*Attorney, Agent, or Firm*—McDermott, Will & Emery

[57] ABSTRACT

An automatic bread maker capable of permitting a user to easily perform a necessary work in using the bread maker, such as setting of menu and preparation of materials, without referring to an operation manual or a cooking recipe. This automatic bread maker comprises: a bread baking mold having a kneading blade at an inner bottom portion thereof; a baking case for detachably accommodating said bread baking mold and having a heater mounted along an inner wall surface thereof; a temperature detector for detecting temperature in the baking case; a memory for storing a plurality of bread making menus and data regarding each menu; a display device for displaying various data stored in the memory; an input operation panel for inputting a start command of a bread making operation and selection of the bread making menu; and controller for invoking various data from the memory in accordance with the bread making menu inputted through the input means. The display device comprises a liquid-crystal display having a surface to which a touch switch is affixed and functions as the input operation panel.

8 Claims, 11 Drawing Sheets

FIG. 5b

F4
```
ERROR!
EXCESSIVELY HIGH TEMPERATURE IN
BAKING CASE            85°C

TEMPERATURE IN BAKING CASE
IS TOO HIGH FOR YEAST PLANTS
TO SURVIVE.
PLEASE MAKE NEXT BREAD MAKING
OPERATION AFTER BAKING CASE IS
WELL COOLED DOWN.
THE FOLLOWING COURSES CAN BE
CARRIED OUT.

| 7. JAM                |
| 10. ADDITIONAL BAKING |
```

F5
```
ERROR!
LOW TEMPERATURE IN BAKING CASE
                       10°C

TEMPERATURE IN BAKING CASE IS LOW,
SO THAT THERE IS A POSSIBILITY OF
INSUFFICIENT FERMENTATION.
PLEASE MAKE NEXT BREAD MAKING
OPERATION AFTER LEAVING THE BODY
AT A WARM PLACE WITH COVER OPENED
OR WARMING BAKING CASE BY
PREHEATING PROCESS.

| PREHEATING |
```

AUTOMATIC BREAD MAKER

BACKGROUND OF THE INVENTION

1. Field of the Invention

The present invention relates to an automatic bread maker capable of automatically making bread by merely setting raw materials of bread such as flour, yeast and water into a material vessel.

2. Description of the Related Art

A conventional bread maker has functions from a kneading process to a baking process, and bread is made by shifting on a basic sequence comprising processes of; kneading materials, fermenting the kneaded dough and baking bread by energizing a heater. In the recent bread maker, which can make increased kinds of breads, a plurality of dedicated menus for these kinds of breads are provided. Therefore, a user can enjoy making bread such as French bread, butter bread, or the like easily by setting the materials for desired bread in a material vessel and by selecting one of the dedicated menus.

Contrarily, however, there arises a problem that the key operation at a control panel is made complicated. As a result, user's mistake increases in operation, for example, mistake in quantity of material or wrong setting of menu. The only solution to such a problem is to perform the setting operation while checking the operation manual and cooking recipe, but this setting operation is very troublesome. If the operation manual and cooking recipe are lost, it becomes difficult to use the apparatus.

SUMMARY OF THE INVENTION

An object of the present invention is to allow a user to easily perform necessary operation in using a bread maker such as setting of menu and preparation of materials without referring to an operation manual or a cooking recipe.

The automatic bread maker according to the present invention comprises: a bread baking mold having a kneading blade at an inner bottom portion thereof; a baking case for detachably accommodating the bread baking mold and having a heater mounted along an inner wall surface thereof; temperature detecting means for detecting temperature in the baking case; memory means for storing a plurality of bread making menus and data regarding each menu; display means for displaying various data stored in the memory means; input means for inputting a start command of a bread making operation and selection of the bread making menu; and control means for invoking various data from the memory means in accordance with the bread making menu inputted through the input means. The display means comprises a liquid-crystal display having a surface to which a touch switch is affixed and functions as the input means.

The control means determines whether or not temperature in the baking case detected by the temperature detecting means is within a first predetermined temperature range when a power supply for the automatic bread maker is turned on. When it is determined that the detected temperature is not within the first predetermined temperature range, the control means makes the display means display the determination and recovery measures and makes selection of bread making menus which are unable to execute outside the first predetermined temperature range ineffective. When the temperature in the baking case continuously detected by the temperature detecting means becomes within the first predetermined temperature range, the control means makes the display means display that the temperature is proper. The control means further makes the display means display a bread making menu which is able to execute outside the first predetermined temperature range when it is determined that the detected temperature in the baking case is not within the first predetermined temperature range.

The input means comprises a timer input section capable of setting a time period for finishing the bread making operation within a predetermined range, and different ranges are preset in the second predetermined temperature range for the case where the bread making is reserved through the timer input section and for the case where the bread making is not reserved.

The memory means stores data of kinds of the bread making menus, kinds and quantities of bread materials necessary for each bread making menu, and calorie and nutritive elements of the bread to be made according to each bread making menu.

The memory means stores a sour bread menu for a yeast incubation process in which bread materials are incubated, fermented and mixed every predetermined time using the kneading blade during the fermentation while an interior of an oven is kept at a fermentation temperature, before the bread making operation from kneading to baking or to fermentation. In this sour bread menu, completion of the yeast incubation process is displayed on the display means and the operation is once suspended when the yeast Incubation process is completed and changes to the bread making operation.

BRIEF DESCRIPTION OF THE DRAWINGS

FIGS. 5a and 5b are schematic diagram showing examples of frames to be displayed when a bread menu is selected from a bread making menu;

DETAILED DESCRIPTION OF THE PREFERRED EMBODIMENT

Figure 1:
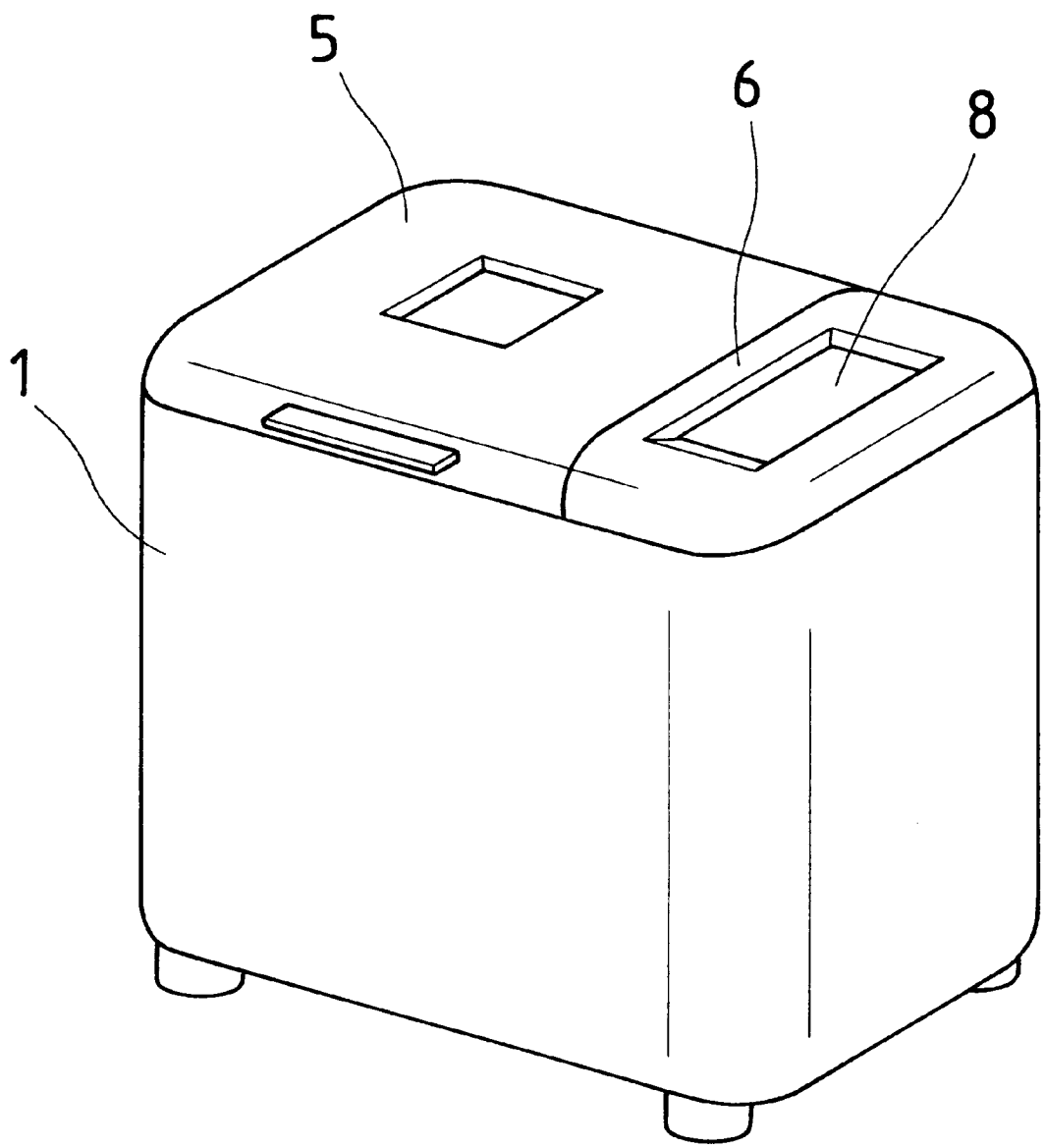
FIG. 1 is a perspective view showing an external appearance of an automatic bread maker according to one embodiment of the present invention.
Figure 2:
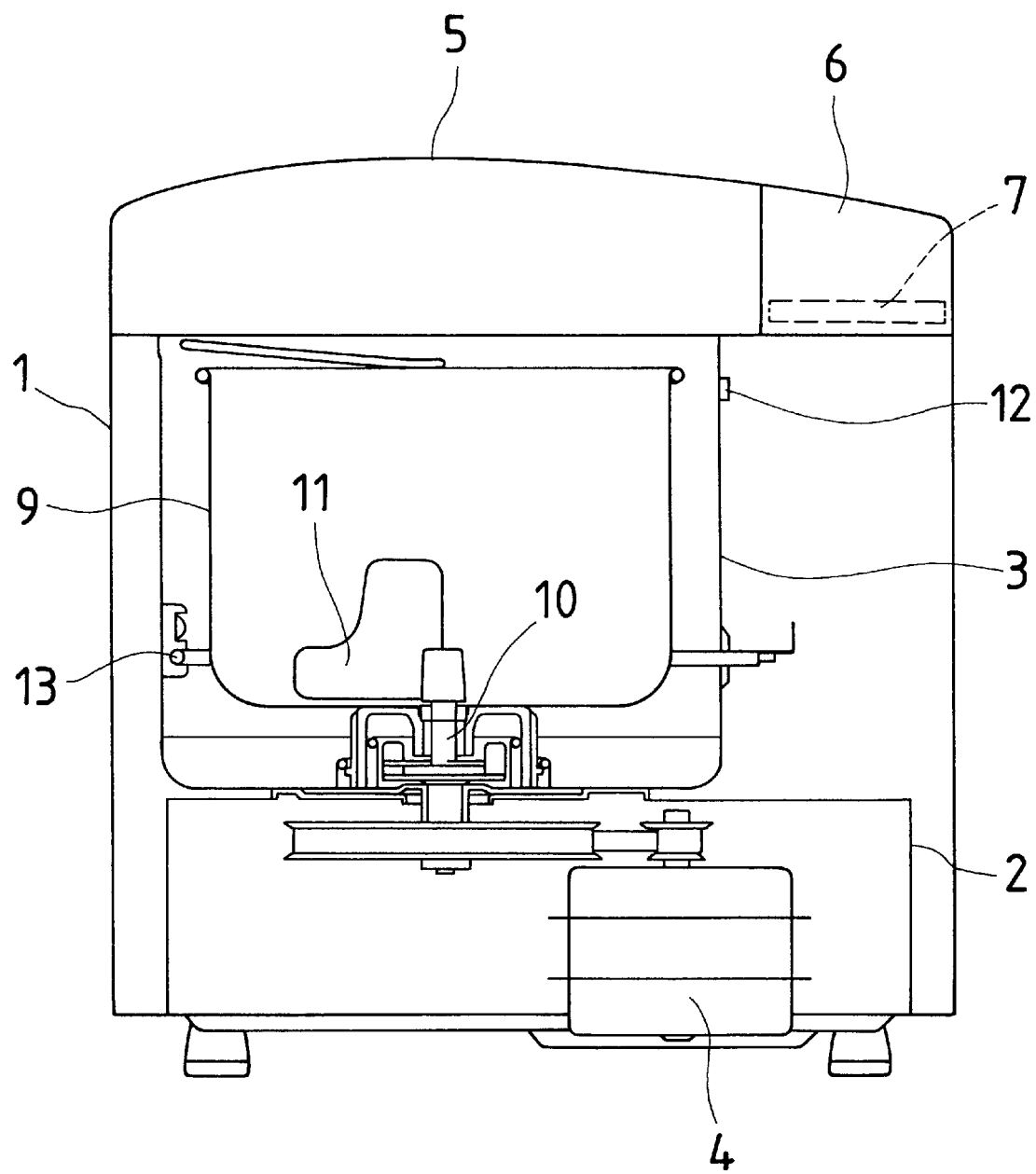
FIG. 2 is a sectional view showing an internal structure of the automatic bread maker shown in FIG. 2.

An embodiment of the present invention will be described referring to the accompanying drawings. In FIGS. 1 and 2, a reference numeral 1 denotes a bread maker body which has a base 2 fixed at a bottom portion thereof, and an oven chamber 3 and a motor 4 are disposed on an upper surface and a lower surface of the base 2, respectively. A reference numeral 5 denotes a lid member which is attached over an upper opening of the oven chamber 3 so as to be opened and closed. A reference numeral 6 denotes a circuit board case which is mounted over the motor 4 and has a circuit board 7 therein and a display panel 8 on a top surface thereof. A reference numeral 9 denotes a bread case which has a rectangular shape in cross section and is disposed in the oven chamber 3. Various bread materials are put into the bread case. A rotating shaft 10 is protruded at a bottom center of the bread case 9 and a kneading blade 11 is detachably attached to the rotating shaft 10. A reference numeral 12 denotes a temperature sensor which is provided on an outer wall surface of the oven chamber 3. A reference numeral 13 denotes a heater which is disposed in the substantially horizontal direction at the lower portion in the oven chamber 3 so as to surround the bread case 9.

Figure 3:
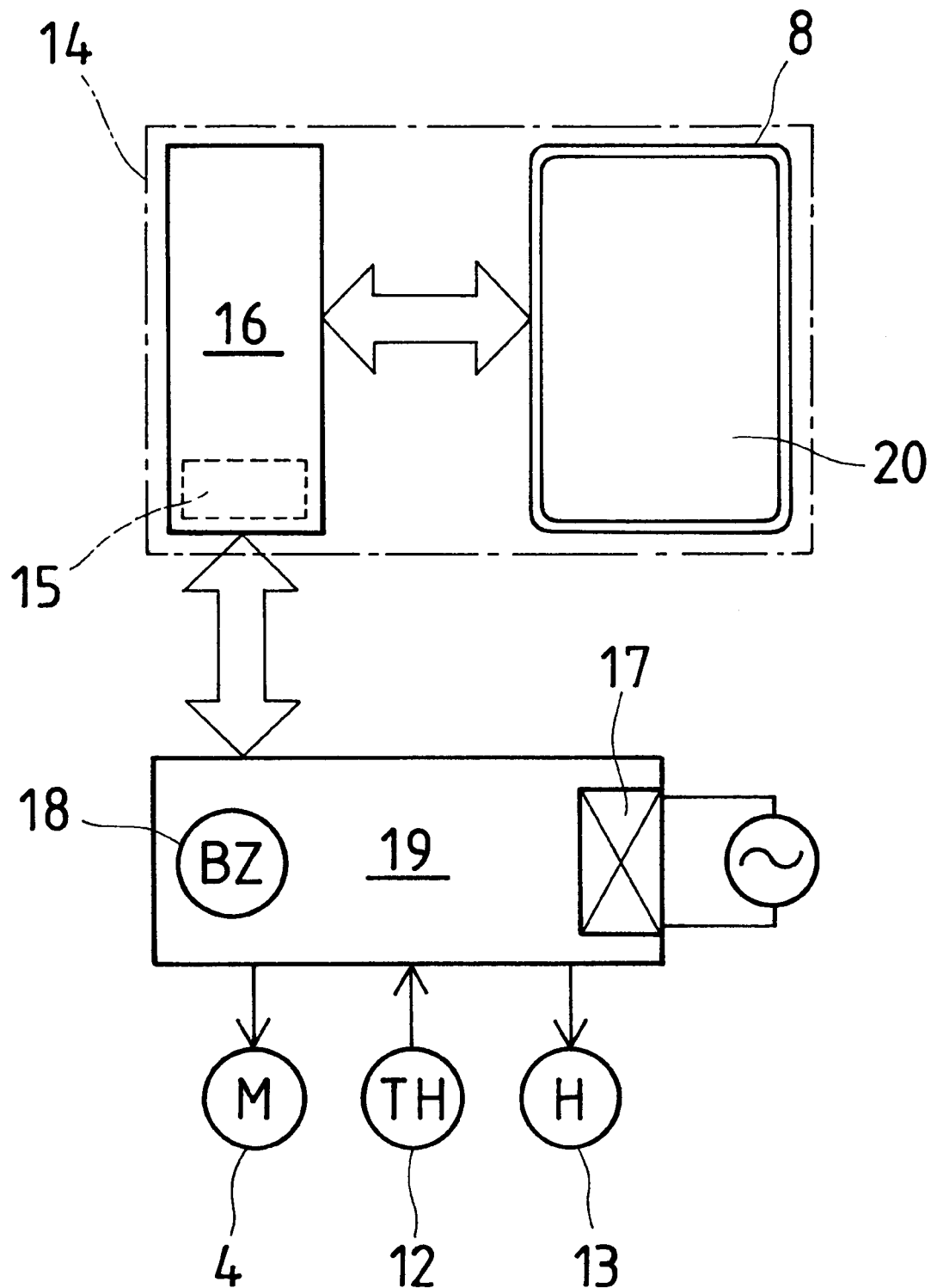
FIG. 3 is a schematic view showing a control system of the automatic bread maker shown in FIG. 1.

FIG. 3 is a functional block diagram of the present invention. A reference numeral 14 denotes a control section which comprises a microcomputer 16 having a memory 15 and a power board 19 having a transformer 17 and a buzzer 18. The power board 19 is connected to the motor 4, the temperature sensor 12, the heater 13, and the microcomputer 16. The microcomputer 16 is provided with a display panel 8. The control section 14 is disposed in the circuit board case 6.

The display panel 8 is in the form of a liquid-crystal display (LCD) and displays a frame for selecting a bread making menu, a frame showing kinds and quantities of materials, a frame showing calorie and nutritive elements contained in bread, a frame showing a cause and recovery measures for an error or a frame showing a bread making process currently executed. Also, a transparent touch switch 20 is affixed to a surface of the display panel 8 so that effectiveness and ineffectiveness of input is switched over in accordance with the frame displayed on the display panel 8.

Figure 4A:
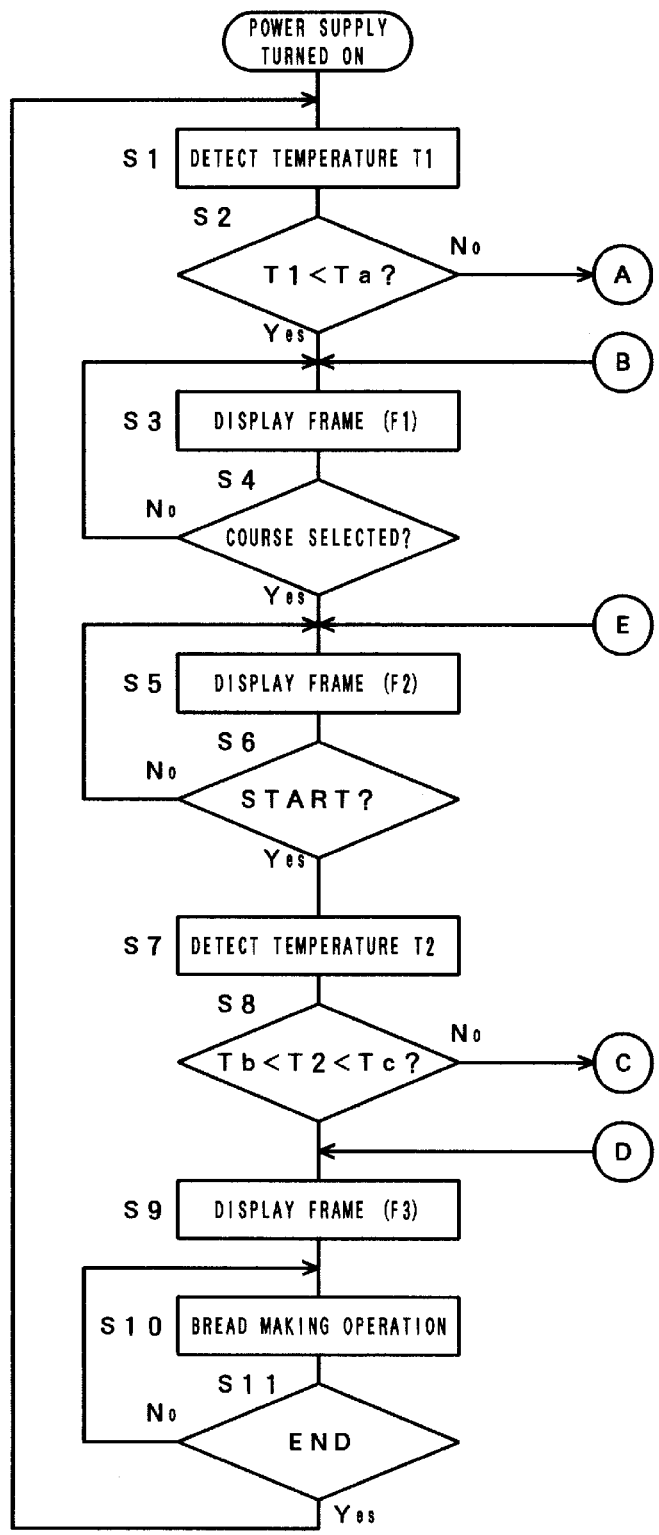
FIGS. 4a to 4c are flowcharts of processing for bread making to be executed by a microcomputer in a control section.
Figure 4B:
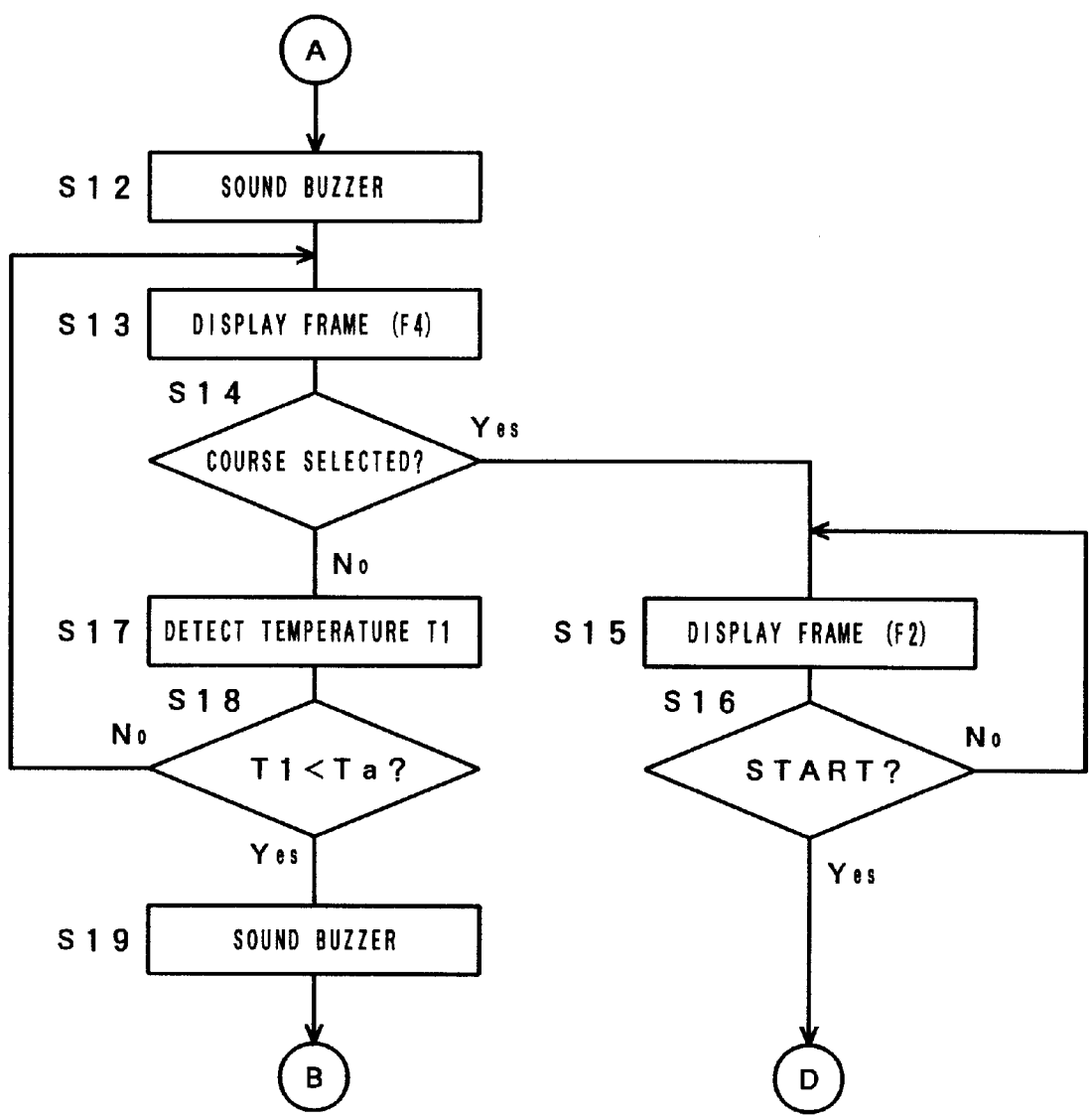
Figure 4C:
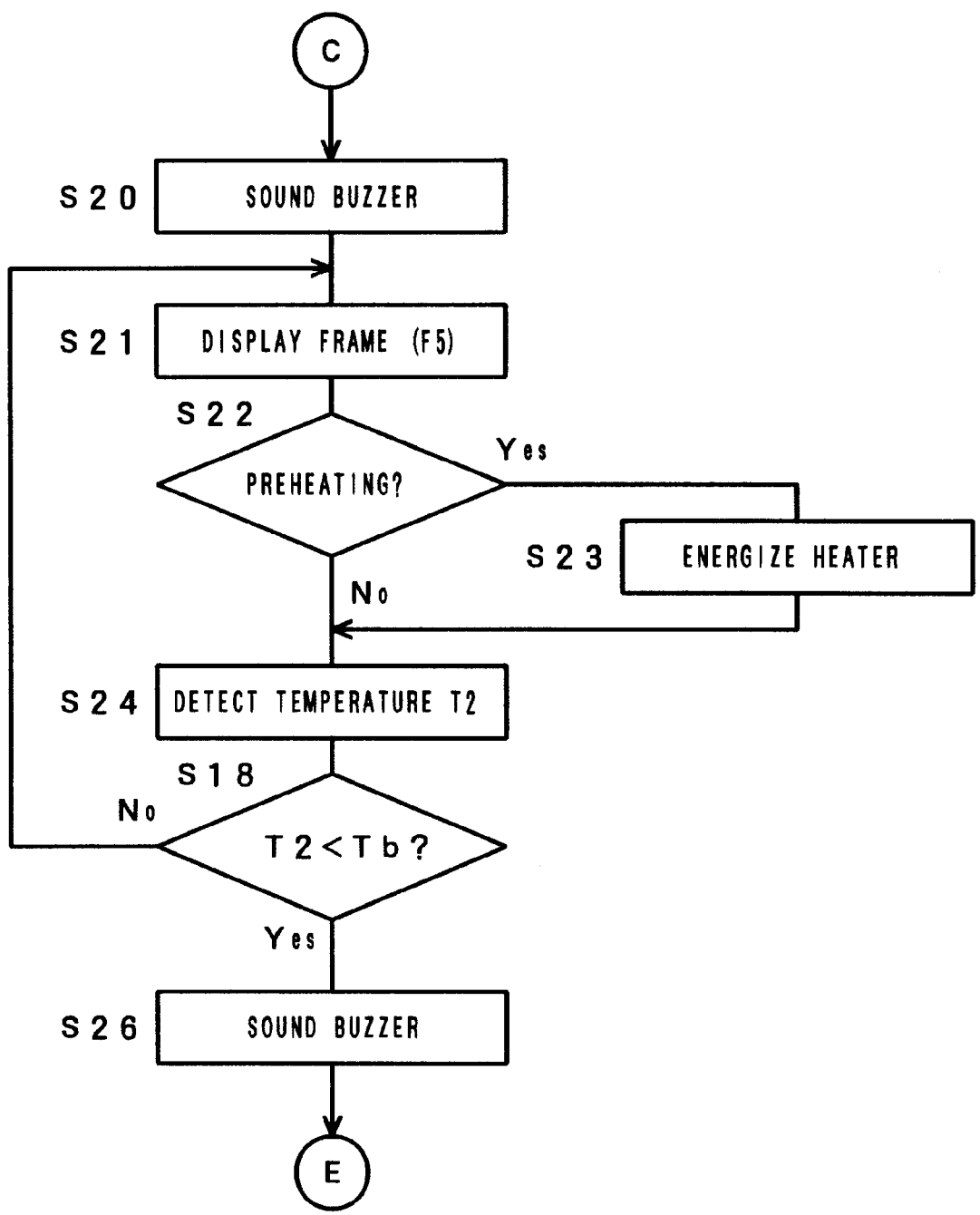
Figure 5A:
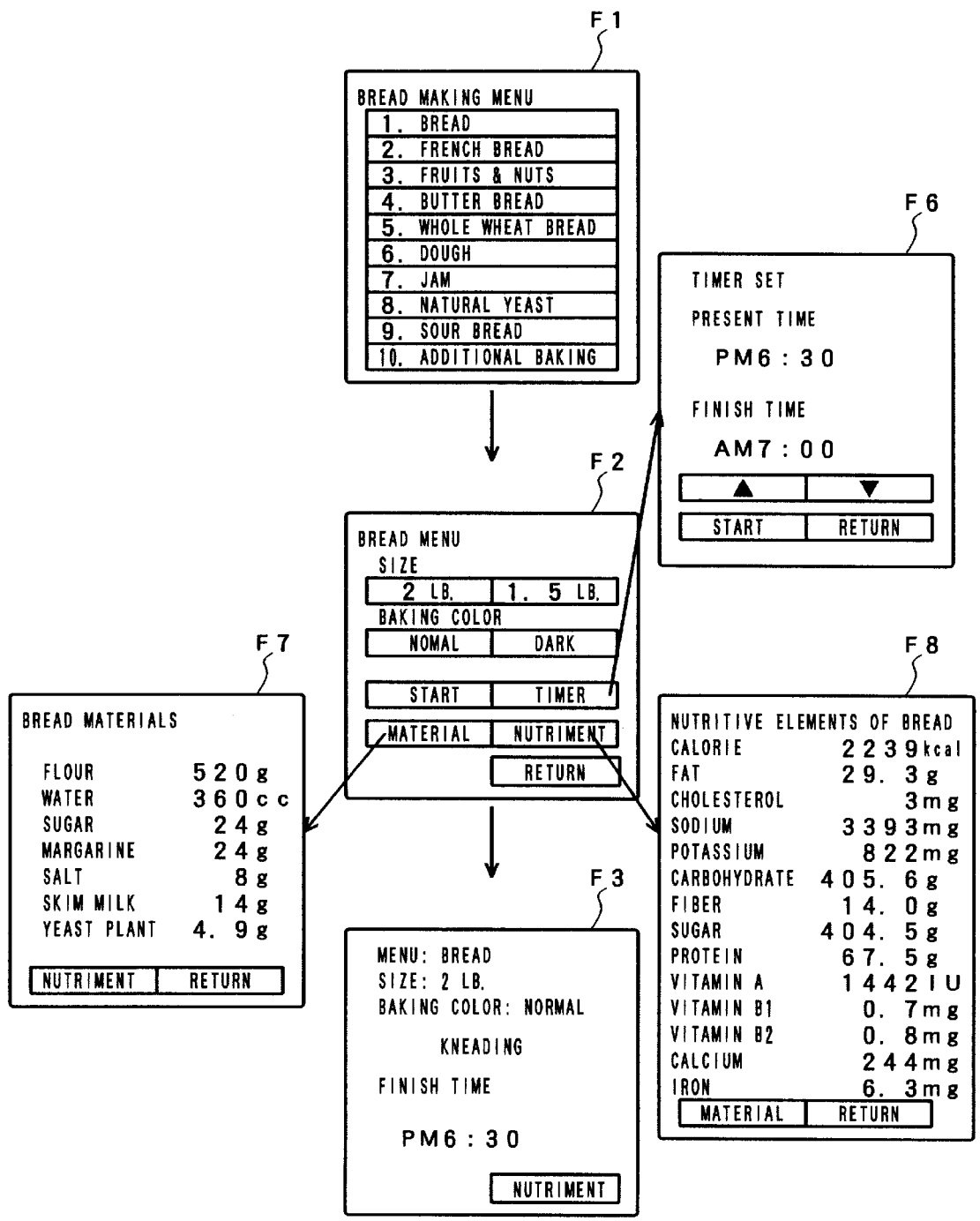

FIG. 4 is a flowchart showing the operation of the bread maker according to the present invention, and FIG. 5 is a schematic view showing various frames displayed on the display panel 8 and a way of operation on each frame. When the power supply is turned on, a temperature T1 in the baking case 3 is detected (Step S1), and it is determined whether or not the temperature T1 is lower than a yeast plant perishing temperature Ta (Step S2). The temperature Ta is set at about 60° C.

When it is determined that T1 is lower than Ta, a frame F1 for selecting a bread making menu is displayed on the display panel 8 (Step S3) to be a state of waiting for selection of bread making menu (Step S4). When a user presses a portion where a desired menu is displayed on the display panel 8 (in this embodiment, "BREAD" is selected), the screen is switched to a frame F2 for setting in the selected menu (Step S5), on which the bread size (1.5 kin or 2 kin, etc.) and the darkness of baking color can be set. The displayed contents on this frame F2 differs depending on the selected menu, and the content which cannot be set because of the property of the selected menu is not displayed.

The bread case 9 having bread materials put therein is placed in the baking case 3, and when "START" is inputted from the frame F2 (Step S6), a temperature T2 in the baking case 3 at this time is detected (Step S7), and it is determined whether or not the temperature T2 is in the temperature range (Tb<T2<Tc) suitable for the activity of yeast plants (Step S8). The temperatures Tb and Tc are set at about 20° C. and 40° C., respectively.

Here, if T2 lies between Tb and Tc, the screen is switched over to a frame F3 displaying the selected course, settings, finishing time of the bread making, and the process currently executed (Step 9). The bread maker starts the bread making operation by executing a kneading process, and subsequently fermenting, degassing, forming, and baking processes (Step 10). When the bread making operation is finished (Step 11), the procedure returns to Step S1 where the temperature T1 in the baking case 3 is detected.

If it is determined in Step S2 that T1 is not lower than Ta, a buzzer 18 sounds (Step S12), and a frame F4 is displayed on the display panel 8 (Step S13). On this frame F4, it is noticed that there is a possibility of perishing of yeast plants because the temperature of the baking case 3 is excessively high, and there are displayed the temperature in the baking case 3, the recovery measures for the error and the bread making courses which can be selected in this state (in this embodiment, "JAM" and "ADDITIONAL BAKING")

If the "JAM" or "ADDITIONAL BAKING" course only selectable on the frame F4 (Step S14) is selected, the display panel 8 displays the frame F2 (Step S15). If the start is inputted (Step S16), the procedure proceeds to Step S9 and the sequence of the selected course is executed. If no course is selected, the temperature T1 in the baking case 3 is monitored continuously (Step S17). When T1 becomes lower than Ta (Step S18), the buzzer 18 notices this fact (Step S19) and the display panel 8 displays the frame F1, to return to Step S3.

If it is determined in Step S8 that T2 is not higher than Tb, the buzzer 18 sounds (Step S20), and a frame F5 is displayed on the display panel 8 (Step S21). On the frame F5, it is noticed that the temperature in the baking case 3 is unsuitable for the activity of yeast plants because the temperature is too low, so that good dough cannot be made, and the temperature in the baking case 3 and the recovery measures for the error are displayed.

In the case of low temperature, a preheating process is provided for making the temperature in the baking case 3 proper in a short time. When "PREHEAT" is pressed on the frame F5 (Step S22), the heater 13 is energized (Step S23). Thereafter, the temperature T2 in the baking case 3 is continuously monitored (Step S24). When T2 becomes higher than Tb (Step S25), the buzzer 18 notices this fact (Step S26) and the display panel 8 displays the frame F2, to execute the processing in Step S5 and the following steps.

If it is determined in Step S8 that T2 is not lower than Tc, the processing in Step S20 and the following steps is executed in the same way as the case where T2 is too low, except for the content on the frame F5 and except that there is no preheating process. Therefore, the explanation and illustration for this case are omitted.

As described above, the temperature is detected two times, i.e. when the power supply is turned on and when the START is inputted. The temperature checking at the time of turning on the power supply prevents yeast plants from being placed mistakenly in the baking case of an excessively high temperature just after bread making is finished. The temperature checking at the time of inputting the START restrains a start of bread making in an environment unsuitable for the activity of yeast plants. The temperature control may be performed by making either of two temperature checking. Quick measures can be taken by the notice of an error occurrence by the buzzer, the display of recovery measures for the error and the temperature in the baking case on the display panel. Depending on the case, the interior of the baking case may be cooled or heated using a dryer or the like. Needless to say, the noticing may be made by a synthetic voice.

When "TIMER" is inputted from the frame F2, the screen is switched to a frame F6 for bread making reservation to set the bread making finish time. In setting the bread baking to finish, e.g., at seven o'clock in the morning, two systems are possible: one is a system to input the time subtracting the present time from the baking finish time, and the other is to directly input the baking finish time. In the frame F6, the latter system which is easier for the user is adopted. By scrolling the time using the upward and downward arrow keys, the baking finish time is set. Then, when "START" is inputted, the screen is switched to the frame F3, and the timer process is started. However, such a set time is not accepted that the time period from the present time to the set time is shorter than the time period required for the bread baking.

In this timer process, when the START is inputted, the determination of Steps S7 and S8 is performed. However, the temperatures Tb and Tc in this case are preset differently from the temperatures which are preset for the case where the kneading process is directly executed without the timer process. In this embodiment, the lower set temperature Tb is not preset and the higher set temperature Tc is preset at about 45° C. for the timer process. This is because: although the temperature is low, the temperature control for keeping the temperature in the baking case 3 at a predetermined value is carried out by the preheating in the timer process so that the temperature at a start of the kneading is brought to the predetermined value; and as to the higher set temperature, the fermentation of yeast plants does not proceed before the bread materials are mixed so that the possibility of over-fermentation is low. The set temperatures are not limited to the values in the this embodiment.

When "MATERIAL" is touched in the frame F2, the screen is switched to a frame F7 displaying the kinds and quantities of materials necessary for the bread menu. This allows the user to prepare the materials and put them into the bread case referring to the display on the frame F7, thereby the materials are set easily. When "RETURN" is touched, the screen returns to the frame F2.

When "NUTRIMENT" is touched in the frame F2, the screen is switched to a frame F8 displaying calorie and nutritive elements contained in the bread to be made according to the bread menu. Using the numeric values displayed on the frame F8 as a standard, the user can know how much nutritive elements are contained in the bread to be taken, by which the balance of food can be achieved by adjusting other subsidiary foods. In this frame also, when "RETURN" is touched, the screen returns to the frame F2. The screed can be switched to the frame F8 from the frames F3 and F7, and can be switched from the frame F8 to the frame F7.

Figure 6:
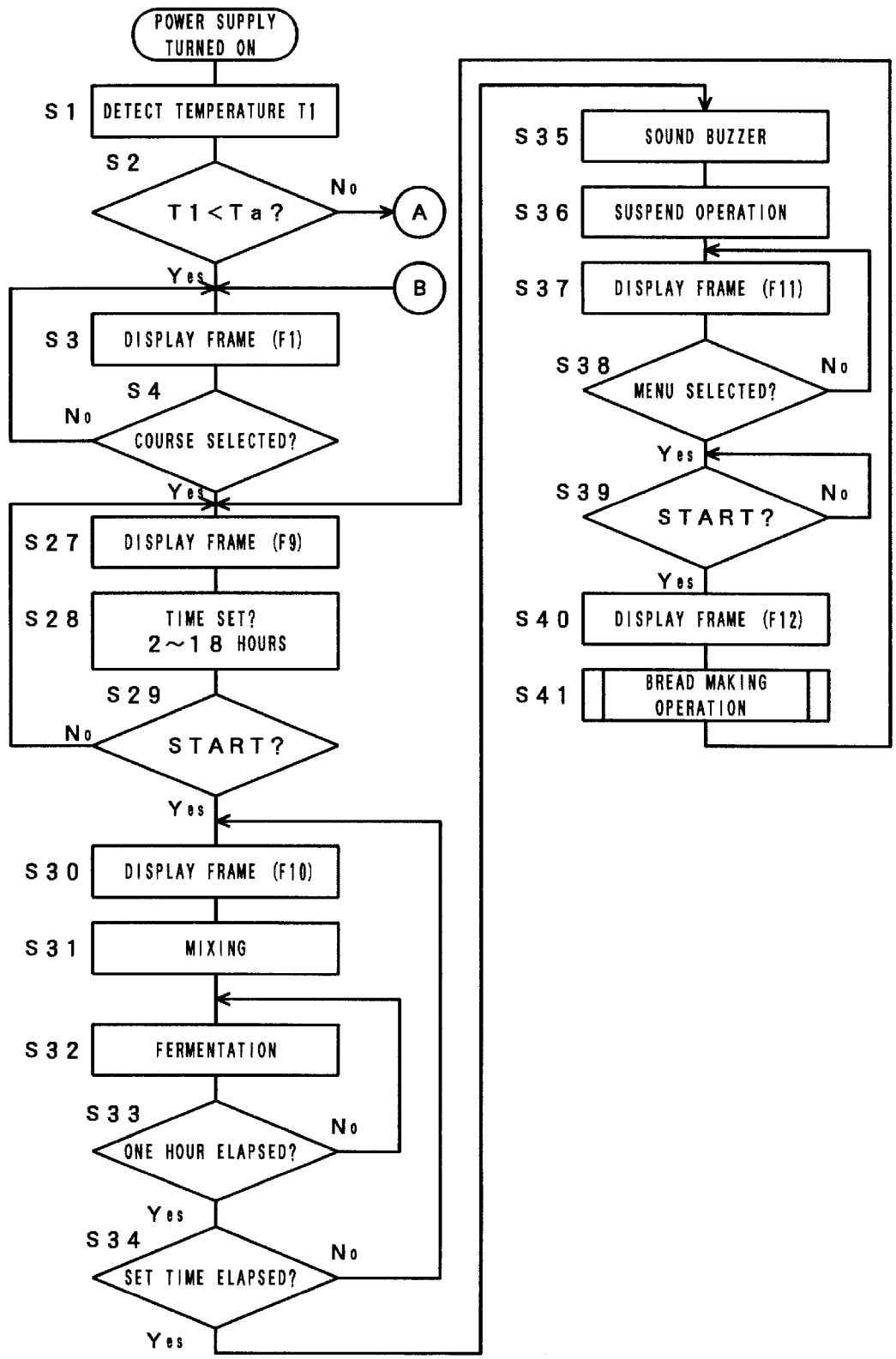
FIG. 6 is a flowchart of processing to be executed by the microcomputer when a sour bread menu is selected from a bread making menu.
Figure 7:
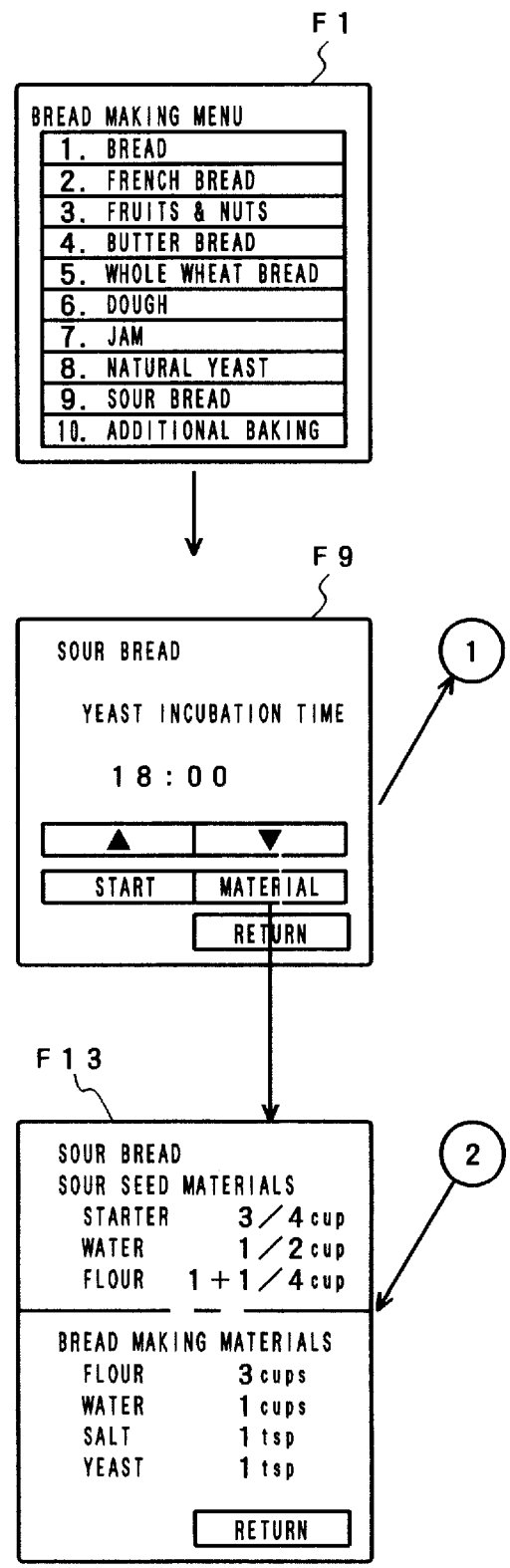
FIG. 7–7b are a schematic diagram showing examples of frames to be displayed on a display panel when a sour bread menu is selected.
Figure 7B:
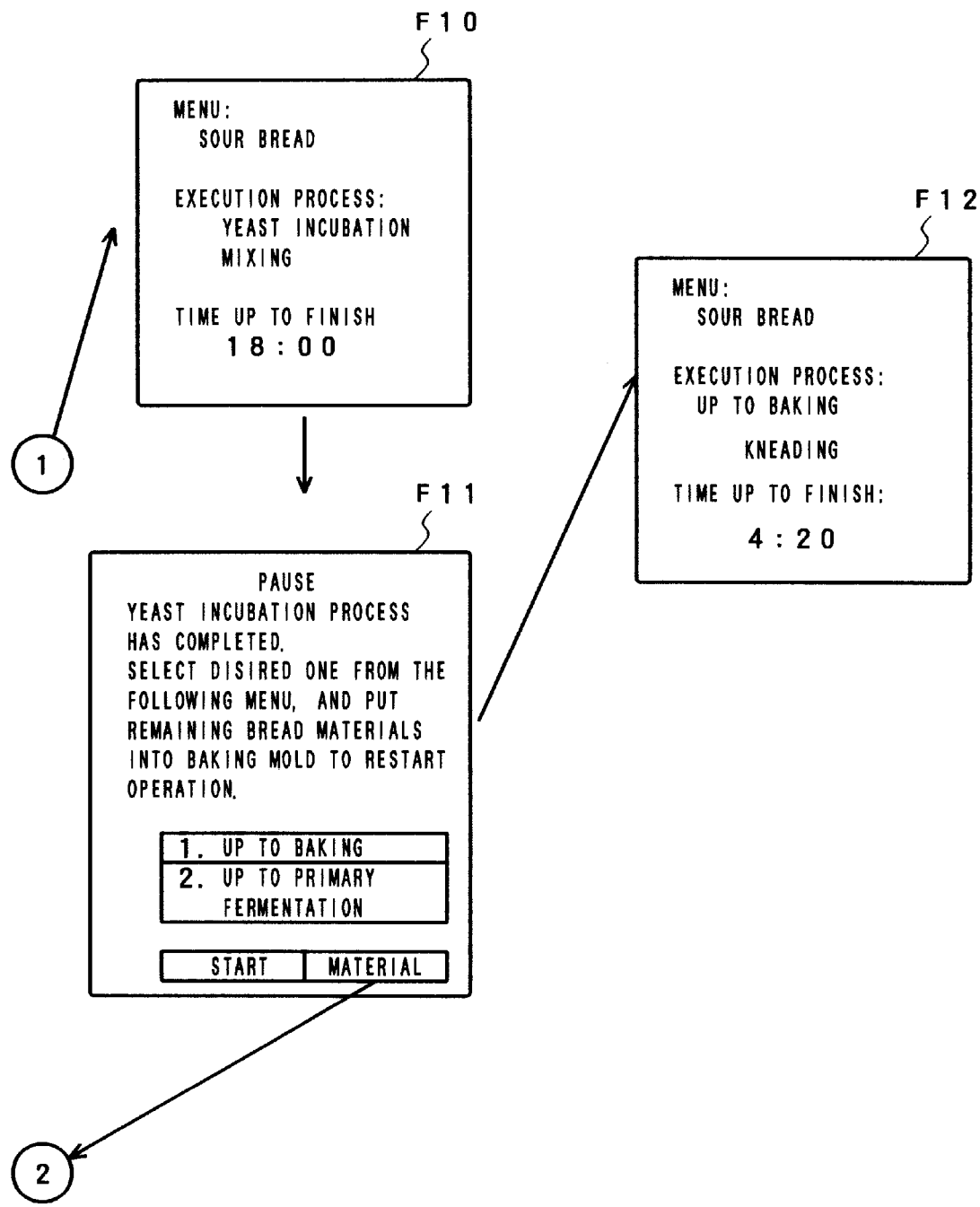

When the user selects "SOUR BREAD" in the frame F1, the program is carried out along a flowchart shown in FIG. 6, and the display panel 8 makes a display as shown in FIG. 7. When "SOUR BREAD" is selected, a time setting frame F9 for sour bread is displayed (Step S27) for setting the time period for a yeast incubation process during which sour seed is incubated and fermented (Step S28). The time period for the yeast incubation process can be set in a range from 2 to 18 hours in one hour step.

When "MATERIAL" is touched in a frame F9, the screen is switched to a frame F13 displaying materials necessary for sour bread. The reason why there is no "NUTRIMENT" input allocation in the case of sour bread is that the nutritive elements change in the process of fermentation and cannot be specified uniquely.

When "START" is touched in the frame F9 (Step S29), the display panel 8 displays a frame F10 showing the selected bread making menu, the process currently executed, and the time up to the finish (Step S30), and the yeast incubation process is executed. In the yeast incubation process, the materials are first mixed for a predetermined time (in this embodiment, for one minute) by rotating the kneading blade 11 at a medium speed (Step S31), and then the materials are incubated and fermented while the interior of the oven is kept at a fermentation temperature (here, at 30° C.) by energizing the heater 13 (Step S32). While the interior of the oven is kept at the fermentation temperature, the mixing action in Step S31 is executed every predetermined time (in this embodiment, every one hour), and the incubation process is executed successively for the time period set in Step S28 (Steps S33 and S34). The rotational speed of the kneading blade, the mixing time, the fermentation temperature and the time interval for executing the mixing action are not limited to those described above.

When the set time has elapsed, the buzzer 18 sounds to notice the finish of the yeast incubation process (Step S35) and the operations of the kneading blade 11 and the heater are suspended (Step S36). By using the sour seed thus made, the ordinary bread making is performed. The display panel 8 displays a frame F11 (Step S37) in which either of a menu for bread making and a menu for bread dough fermentation can be selected, and the desired menu is selected (Step S38).

In this frame F11 as well, "MATERIAL" can be selected. That is to say, the frame F13 can be called to ascertain the materials necessary for bread making. When "START" is touched in the frame F11 (Step S39), the display panel 8 displays a frame F12 showing the selected bread making menu, the process currently executed, and the time up to the finish (Step S40), and the conventional bread making operation is performed according to the menu selected in Step S35 (Step S41).

Thus, in the sour bread menu, the yeast incubation process for incubating the sour seed can be executed automatically and the time period for the process can be set arbitrarily, so that the baking of the sour bread, which has been difficult in home cooking, is made possible to allow the user to enjoy sour bread with ease. Sufficiently delicious sour bread was made by the sour bread menu in accordance with the material recipe shown in frame F13 in FIG. 7.

According to the present invention, as the touch switch is provided on the surface of the LCD as display means and operation keys are eliminated, the necessary operation can be carried on referring to the screen and therefore the operation error can be reduced. Also, the LCD screen can display various information data, i.e., the kind of error and the recovery measures therefor when an error occurs, the kind of the selected bread making menu, the kinds and quantities of materials in the bread making menu, and the nutriment contained in the bread.

Also, it is prevented that a material, especially yeast plant, is made perish by setting it in a high-temperature baking case just after baking. When the interior of the baking case has a temperature suitable for bread making, this fact is displayed. At this time, by setting the materials in the bread case, the bread making operation can be started quickly. Moreover, since the recovery measures for the error is displayed, the suitable measure against the error can be taken positively.

Further, since the yeast incubation process is added, anyone can enjoy sour bread easily, to enhance the commodity value of the bread maker.

What is claimed is:

1. An automatic bread maker comprising:
   a bread baking mold having a kneading blade at an inner bottom portion thereof;
   a baking case for detachably accommodating said bread baking mold and having a heater mounted along an inner wall surface thereof;
   temperature detecting means for detecting temperature in said baking case;

memory means for storing a plurality of bread making menus and data regarding each menu;

display means for displaying various data stored in said memory means;

input means for inputting a start command of a bread making operation and selection of the bread making menu; and control means for invoking various data from said memory means in accordance with the bread making menu inputted through said input means;

wherein said display means comprises a liquid-crystal display having a surface to which a touch switch is affixed and functions as said input means.

2. An automatic bread maker according to claim 1, wherein said control means determines whether or not temperature in said baking case detected by said temperature detecting means is within a first predetermined temperature range when a power supply for said automatic bread maker is turned on, and when it is determined that the detected temperature is not within the first predetermined temperature range, said control means makes said display means display the determination and recovery measures and makes selection of bread making menus which are unable to execute outside the first predetermined temperature range ineffective, and when the temperature in said baking case continuously detected by said temperature detecting means becomes within the first predetermined temperature range, said control means makes said display means display that the temperature is proper.

3. An automatic bread maker according to claim 2, wherein when it is determined that the detected temperature in said baking case is not within the first predetermined temperature range, said control means further makes said display means display a bread making menu which is able to execute outside the first predetermined temperature range.

4. An automatic bread maker according to claim 1, wherein when the start command for bread making operation is inputted through said input means, said control means determines whether or not the temperature in said baking case detected by said temperature detecting means is within a second predetermined temperature range, and when it is determined that the detected temperature is not within the second predetermined temperature range, said control means makes said display means display the de termination and recovery measures, and when the temperature in said baking case continuously detected by said temperature detecting means falls within the second predetermined temperature range, said control means makes said display means display that the temperature is proper.

5. An automatic bread maker according to claim 1, wherein said input means further comprises a timer input section capable of setting a time period for finishing the bread making operation within a predetermined range, and different ranges are preset in said second predetermined temperature range for the case where the bread making is reserved through said timer input section and for the case where the bread making is not reserved.

6. An automatic bread maker according to claim 1, wherein said memory means stores data of kinds of the bread making menus, kinds and quantities of bread materials necessary for each bread making menu, and calorie and nutritive elements of the bread to be made according to each bread making menu.

7. An automatic bread maker according to claim 1, wherein said memory means stores a sour bread menu for a yeast incubation process in which bread materials are incubated, fermented and mixed every predetermined time using said kneading blade during the fermentation while an interior of an oven is kept at a fermentation temperature, before the bread making operation from kneading to baking or to fermentation.

8. An automatic bread maker according to claim 7, wherein said sour bread menu includes an operation sequence in which completion of the yeast incubation process is displayed by said display means and the operation is once suspended when the yeast incubation process is completed and changes to the bread making operation.

* * * * *